United States Patent
Nguyen

[19]

[11] Patent Number: 6,107,838

[45] Date of Patent: Aug. 22, 2000

[54] SIMULTANEOUS TWO-WAY COMMUNICATION SYSTEM USING A SINGLE COMMUNICATION PORT

[75] Inventor: Cong D. Nguyen, Sachse, Tex.

[73] Assignee: Honeywell International, Inc., Morristown, N.J.

[21] Appl. No.: 08/382,332

[22] Filed: Feb. 1, 1995

[51] Int. Cl.[7] .................................................. H03D 1/00
[52] U.S. Cl. .......................................................... 327/50
[58] Field of Search .............................. 327/51, 52, 53, 327/54, 55, 57, 63, 65, 66, 67, 482; 455/5.1, 6.1; 395/295; 326/63, 80

[56] References Cited

U.S. PATENT DOCUMENTS

| | | | |
|---|---|---|---|
| 4,010,453 | 3/1977 | Lewis | 327/52 |
| 4,081,701 | 3/1978 | White, Jr. et al. | 327/51 |
| 4,417,320 | 11/1983 | Ei | 326/63 |
| 4,490,655 | 12/1984 | Feldman | 326/63 |
| 4,503,344 | 3/1985 | Bripphart | 327/143 |
| 4,584,672 | 4/1986 | Schutz et al. | 327/51 |
| 4,947,059 | 8/1990 | Kim | 327/51 |
| 5,017,813 | 5/1991 | Galbraith et al. | 326/63 |
| 5,377,149 | 12/1994 | Gaultier | 327/51 |
| 5,406,147 | 4/1995 | Coyle et al. | 327/51 |

*Primary Examiner*—My-Trang Nuton
*Attorney, Agent, or Firm*—William D. Lanyi

[57] ABSTRACT

A circuit is provided for transmitting and receiving digital signals at a single circuit point simultaneously without significant interference with the output signal. The circuit monitors current flow at the common pin and converts the current flow to a voltage potential between circuit points as a function of the status of the output and input signals at the pin. In other words, the voltage potential between the preselected circuit points defines the status of the input based on the status of the output. Therefore, regardless of the status of the output from a first device, the status of the input at the common pin can be determined by monitoring the voltage potential between the two circuit points.

20 Claims, 5 Drawing Sheets

SIMULTANEOUS TWO-WAY COMMUNICATION SYSTEM USING A SINGLE COMMUNICATION PORT

BACKGROUND OF THE INVENTION

1. Field of the Invention

The present invention relates generally to a two-way communication system and, more particularly, to a means which permits binary signals to be exchanged between devices through a single communication port, or pin.

2. Description of the Prior Art

When a pair of devices (e.g. such as a sensor and a programmable logic controller (PLC), two microprocessors, two sensors, or any two devices with input and output capability) need to communicate with each other, the standard method for permitting this two-way communication is to connect an output pin of the first device with an input pin of the second device and connect an output pin of the second device within an input pin of the first device. Binary information is then transmitted from the first device to the second device through one pair of communication ports, or pins, and binary information is transmitted from the second device to the first device through a separate pair of communication ports, or pins. Another method which permits two-way communication between devices utilizes time division multiplexing, wherein one device occupies each pin half of the time and the other device occupies each pin during the remaining time period. This multiplexing method does not permit either of the devices to provide a continuously valid output. This method and other known methods require additional input pins and circuitry to synchronize the output disable timing of one circuit with the input signal coming in from the other circuit. An input circuit that accepts the output from a bi-directional pin also requires a dedicated timing control function in order to read the desired output only when it is valid.

It would therefore be beneficial if a means is provided to permit two devices to communicate with each other through a single pin, or communication port, simultaneously without the signals from one device interfering with the signals from the other. This would be an improvement over known devices in which the output signal from a first device would corrupt the input signal coming from a second device to the first device.

SUMMARY OF THE INVENTION

The present invention provides a means by which two devices can communicate through a single pin, or communication port, without permitting the output signals from one device to interfere with the ability of that device's input recognition circuitry to properly interpret input signals from another device. The circuit of the present invention comprises a first circuit point and a means for transmitting an output signal to the first circuit point. In addition, it comprises a means for receiving an input signal at the first circuit point simultaneously while the transmitting means transmits the output signal to the first circuit point. In a preferred embodiment of the present invention, the receiving means comprises a means for determining whether the output signal being transmitted is high or low and, in addition, the receiving means comprises a means for sensing a first current flowing through the first circuit point. The receiving means also comprises a means for converting the first current to a voltage differential between second and third circuit points wherein the voltage differential is representative of the input signal at the first circuit point.

In a preferred embodiment of the present invention, the receiving means comprises a first transistor and a second transistor. The bases of the first and second transistors are connected together and the emitters of the first and second transistors are connected to the first circuit point. The receiving means also comprises a third transistor and a fourth transistor. The bases of the third and fourth transistors are connected together and the emitters of the third and fourth transistors are connected to the first circuit point.

In a preferred embodiment of the present invention, the receiving means comprises a fifth transistor with the base of the fifth transistor being connected to the base of the first transistor. The collector of the fifth transistor is connected to the second circuit point and the emitter of the fifth transistor is connected to a point of ground potential. The receiving means also comprises a sixth transistor with a seventh transistor. The collector of the sixth transistor is connected to the second circuit point. The collector of the seventh transistor is connected to the first circuit point. The emitters of the sixth and seventh transistors are connected to a point of ground potential. In a preferred embodiment of the present invention, the collector of the first transistor is connected to the third circuit point and the collector of the fourth transistor is connected to the third circuit point.

The present invention monitors the current flowing through the first circuit point in order to determine the status of an incoming binary signal. Based on the status of the output signals from the device, the circuit uses the relative currents at predetermined circuit points to determine the status of the input signals and then converts the detected status into a voltage differential between two circuit points in order to provide information relative to the incoming binary signal.

BRIEF DESCRIPTION OF THE DRAWINGS

The present invention will be more fully understood from a reading of the Description of the Preferred Embodiment in conjunction with the drawings, in which.

DESCRIPTION OF THE PREFERRED EMBODIMENT

Figure 1:
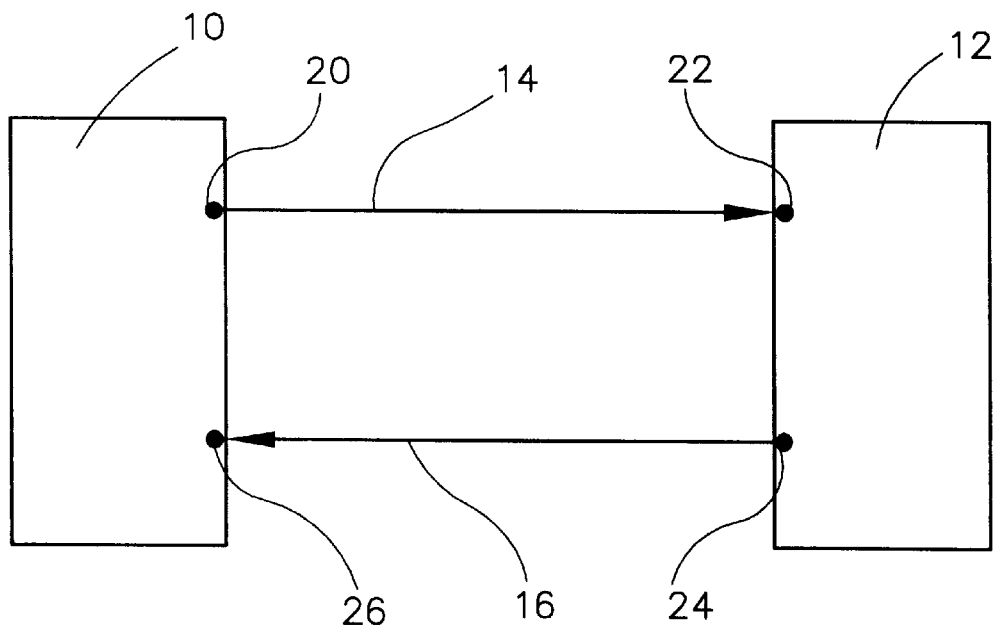
FIG. 1 illustrates a conventional means for connecting two devices together for bi-directional communication.

Throughout the Description of the Preferred Embodiment, like components will be identified by like reference numerals. FIG. 1 illustrates a situation wherein a first device 10 and a second device 12 are connected together for the purpose of digital communication. The typical means for providing this bi-directional communication capability is to provide a first signal line 14 and a second signal line 16 which are each connected to a pair of pins. In other words, binary information is passed from the first device 10 to the second device 12 by connecting a communication line between a pin 20 of the first device 10 and a pin 22 of the second device 12. Similarly, digital information from the second device 12 is transmitted to the first device 10 by connecting a communication line 16 to a first pin 24 of the second device 12 to a pin 26 of the first device 10. This arrangement, which is shown in FIG. 1, permits simultaneous digital communication between the first and second devices. However, this technique requires two separate connections, 14 and 16, between the devices and requires four pins (i.e. two pins for each device). In certain circumstances, the pins required to perform the technique shown in FIG. 1 are not available. It would therefore be beneficial if a connection between the first and second devices, 10 and 12, could be made in the manner illustrated in FIG. 2.

Figure 2:
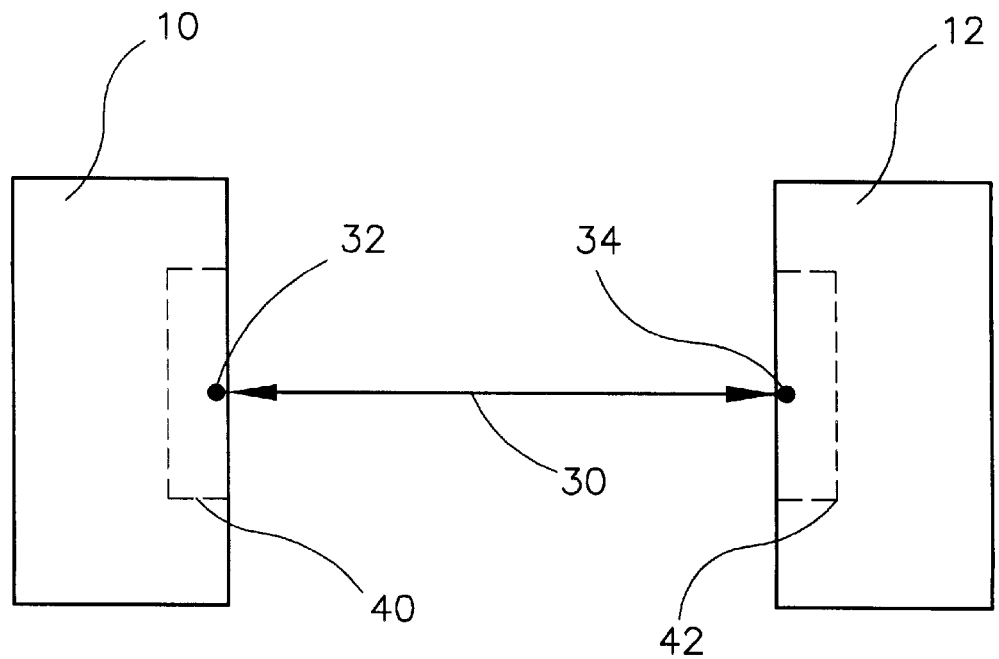
FIG. 2 illustrates a connection means between first and second devices that is made possible by the use of the present invention.

FIG. 2 shows the first device 10 and the second device 12 connected together by a single line 30 which is connected to a single pin 32 in the first device 10 and a single pin 34 in the second device 12. In order to permit valid digital signals to be both transmitted and received through pin 32 of the first device, the present invention provides a circuit arrangement 40. The circuit arrangement 40, which will be described in greater detail below, makes this possible and is represented by a dashed line box in FIG. 2. The second device 12 is also provided with a representation of the circuit 42. However, it should be realized that the present invention does not require that both devices implement its features. The present invention need only be implemented in the device which requires the dual purpose use of a single pin for simultaneous transmission and receipt of digital information. In other words, pin 32 of the first device 10 could possibly be connected to two different pins in another device which is not provided with the present invention circuitry.

As described above, the present invention provides a way to determine the binary value of an input signal through the same pin, or communication port, through which a binary output signal is continuously provided. The present invention permits an input signal to be superimposed on a continuously valid output pin. This permits the simultaneous transmission and receipt of digital signals through a common pin and therefore reduces the number of input and output pins and communication lines that are required. This reduction in the number of input and output pins is achieved without incurring all of the overhead and disadvantages of the known methods for providing a bi-directional pin. In effect, the present invention provides a means for transmitting a voltage output signal that is combined with a current sensing input capability.

Figure 3:
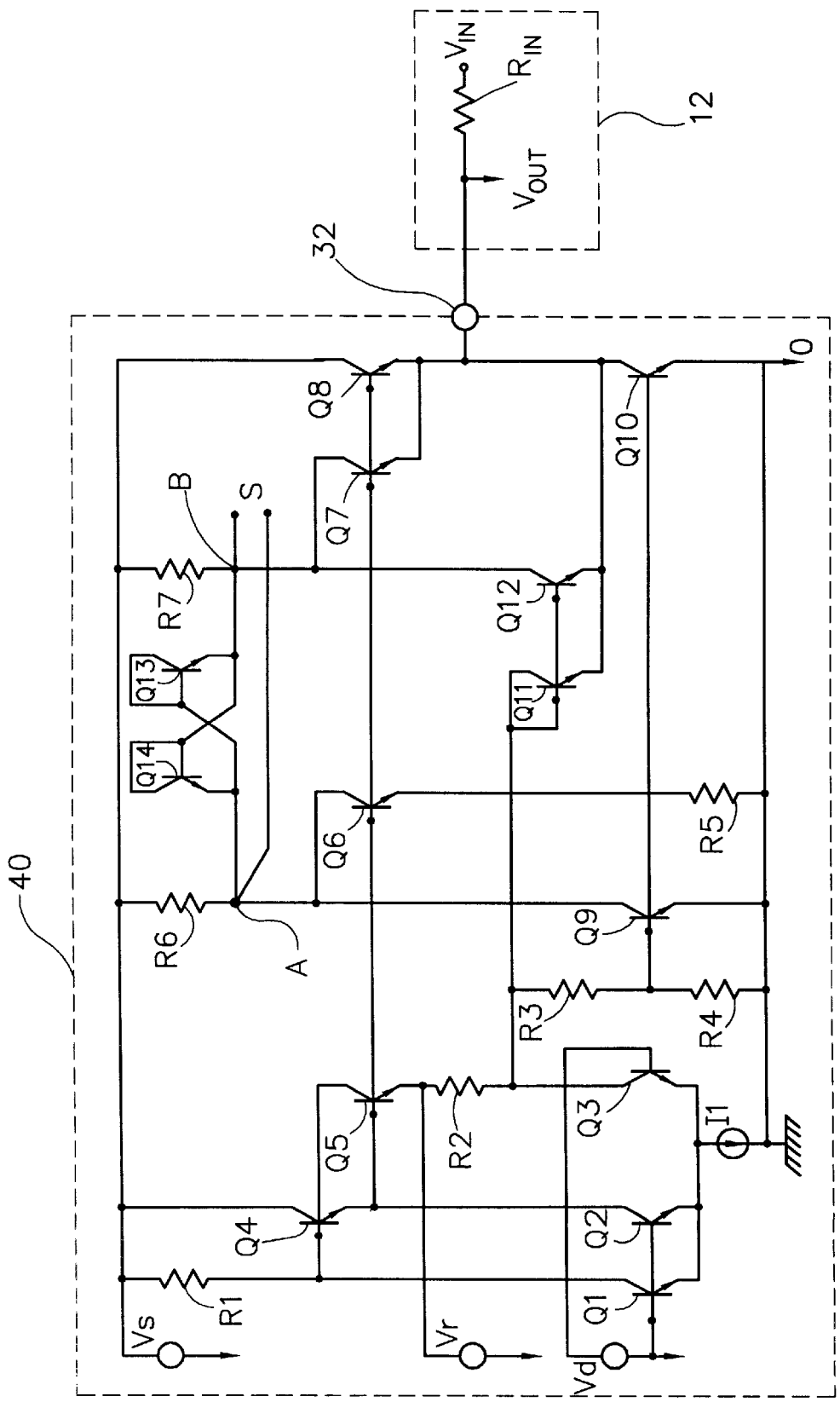
FIG. 3 is an exemplary circuit schematic which employs the concepts of the present invention.

FIG. 3 shows a circuit that comprises the present invention. In a manner which will be described in greater detail below, the present invention imposes the binary value of an input signal at pin 32 onto an independent binary voltage output signal without changing the output logical value. It monitors changes in the condition of the output caused by the switching of the binary value of the input signal.

With continued reference to FIG. 3, the four possible states at pin 32 will be described along with the effect on the pertinent circuit components and circuit points within the circuit 40 as a result of those states. It should be understood that, although the present invention is employed within the circuit 40, not all of the components within circuit 40 are required in every implementation of the present invention. In addition, although the second device 12 is illustrated by the circuit shown within the dashed box in FIG. 3, it should be understood that alternative means for providing an input signal to pin 32 could be used in conjunction with the present invention. In addition, it should be understood that FIG. 3 represents a more detailed illustration of a portion of the arrangement shown in FIG. 2. For example, circuit 40 is illustrated in FIG. 2 as being a portion of the first device 10 that is associated with pin 32. In addition, it should be understood that the second device 12 illustrated in FIG. 3 does not necessarily comprise circuitry 42 that is described above in conjunction with FIG. 2. In other words, a second device 12 need not have the capability of both transmitting and receiving on a single pin of its structure. Since the illustration of the second device 12 in FIG. 3 is provided only to show a source of a signal received as an input signal at pin 32, it will be assumed in the following discussion that only the first device is provided with an appropriate circuit 40 that comprises the present invention and its related ability to simultaneously transmit and receive binary signals through a common pin, or communication port. Although the present invention in no way precludes the use of the present invention in both the first and second device, the following discussion will not assume that condition.

With continued reference to FIG. 3, the four possible states at pin 32 are a high output with a low input, a high output with a high input, a low output with a low input and a low output with a high input. Each of these states will be described individually in the following discussion.

Transistor Q7 is selected so that the current through its emitter is approximately one tenth that of transistor Q8. Since the bases and emitters of transistors Q7 and Q8 are connected together, the current flowing through transistor Q7 is also approximately one tenth of that which is flowing through transistor Q8.

When the output signal at pin 32 is required to be high, the bases of transistors Q6, Q7 and Q8 are provided with current to raise the voltage potential at pin 32 to a logically high state. When the input to pin 32 from the second device 12 is low, there is an electrical current flowing through resistor RIN. The resistance of resistor R5 is selected so that the collector-emitter current of transistor Q6 is approximately half of the collector-emitter current of transistor Q7. The resistance of resistor R5 is chosen according to the requirement of the load resistor RIN. Therefore, the voltage at circuit point A is higher than the voltage at circuit point B. This voltage differential can be sensed and can provide a signal S that represents the status of the input signal at point 32. In the terminology used to described the present invention, the first circuit point is pin 32, the second circuit point is circuit point A in FIG. 3 and the third circuit point is circuit point B in FIG. 3. The status of the input binary signal can be determined by measuring the difference between the voltage potential at circuit points A and B. In other words, the status of the input signal at pin 32, which is measured as signal S, is represented by the voltage at the third circuit point $V_B$ minus the voltage at the second circuit point $V_A$.

With continued reference to FIG. 3, if the output at pin 32 from circuit 40 is high and the input to pin 32 from the second device 12 is also high, transistors Q7 and Q8 have very small currents flowing through them as compared to the collector-emitter current of transistor Q6 and, as a result, the voltage of the third circuit point $V_B$ is approximately equal to the supply voltage $V_S$. Therefore, the voltage $V_A$ is less than the voltage $V_B$ at the third circuit point. Signal S, which is equal to $V_B$ minus $V_A$ identifies the input at pin 32 as being high.

Transistors Q9 and Q10 are selected to provide a known ratio of currents in the manner described above in relation to transistors Q7 and Q8. As can be seen, the bases of transistors Q9 and Q10 are connected together and are pulled down when the output signal from the first device is low. The emitters of transistors Q9 and Q10 are both connected to a point of ground potential. When the output signal from the first device is low, transistor Q11 pulls its base and collector voltage down and the current through transistor 11 is a function of the drive current provided through transistor Q5 and resistor R2. Under the condition that the input is low, the current through transistor Q9 is very small and the current through transistor Q12 is measurably higher than the current through transistor Q9. The voltage at circuit point A is measurably higher than the voltage at circuit point B. Therefore, signal S, which is equal to $V_B$ minus $V_A$, is low and this indicates that the input signal at pin 32 is also low.

With continued reference to FIG. 3 and the assumption that the output is low while the input is high, the current through transistor Q10 is significantly higher than the current through transistor Q9 because of the fact that those transistors are particularly selected to achieve a predetermined ratio of currents. The current through transistor Q9 is sufficient to lower the voltage at circuit point A to a magnitude less than the voltage at circuit point B. Therefore, since the signal S is defined as being the voltage $V_B$ at circuit point B minus the voltage $V_A$ at circuit point A, the input signal at pin 32 must be high.

It can be seen that the present invention provides a means for determining the status of a input signal under conditions when the output signal from the first device is either high or low. Under both conditions of the output signal, the input signal is defined as being represented as the difference between the second and third circuit points. In other words, the input signal status is determined by:

$$S = V_B - V_A \quad (1)$$

The relationship shown in equation 1 is true for both possible states of the output signal.

In FIG. 3, some of the components illustrated in the circuit are not described in detail because they do not play a relevant role in the operation of the present invention. As described above, transistors Q7 and Q8 are selected as a function of their emitter areas to achieve a one to ten ratio of currents through them. In addition, the emitter areas of transistors Q11 and Q12 are chosen to result in a three to one ratio of currents through them. Transistors Q9 and Q10 are selected, based on their emitter areas, to achieve a one to eleven ratio of currents through them. All three ratios are selected based on various resistor values to maximize the circuit noise margin.

In order to more clearly identify the components in FIG. 3 with respect to the terminology used to describe the invention below, it should be understood that pin 32 is the first circuit point, circuit point A is the second circuit point and circuit point B is the third circuit point. Transistor Q7 is the first transistor and transistor Q8 is the second transistor. The third transistor is transistor Q11 and the fourth transistor is transistor Q12. The fifth transistor is transistor Q6 and the sixth transistor is transistor Q9. The seventh transistor is transistor Q10. The bases of transistors Q6, Q7 and Q8 are pulled up when the output of the circuit in FIG. 3 is high while the bases of transistors Q9 and Q10 are pulled high when the output from the circuit in FIG. 3 is low.

The second device 12 changes the voltage potential across resistor RIN in order to transmit a signal that is received as an input signal at pin 32.

TABLE I

| $V_{IN}$ | $V_O$ | $V_O^*$ | I1 | I2 | I1 + I2 | (I1 + I2)* | $V_O^*(I1 + I2) + V_O(I1 + I2)^*$ |
|---|---|---|---|---|---|---|---|
| LOW | LOW | HIGH | OFF | LOW | LOW | HIGH | LOW |
| LOW | HIGH | LOW | HIGH | OFF | HIGH | LOW | LOW |
| HIGH | LOW | HIGH | OFF | HIGH | HIGH | LOW | HIGH |
| HIGH | HIGH | LOW | LOW | OFF | LOW | HIGH | HIGH |

Figure 5A:
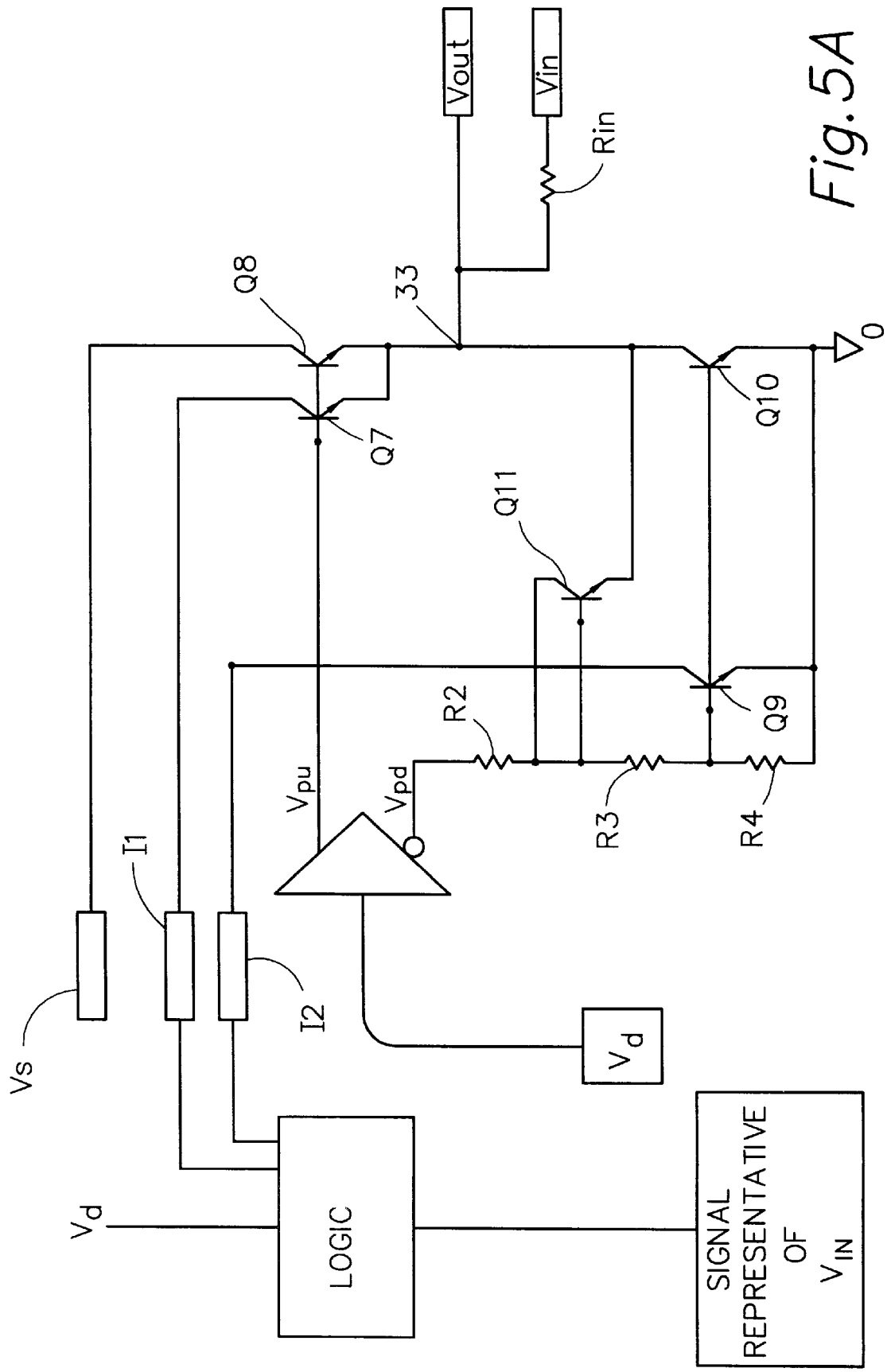
FIGS. 5A and 5b are an alternative representations of the circuit shown in FIG. 3.
Figure 5B:
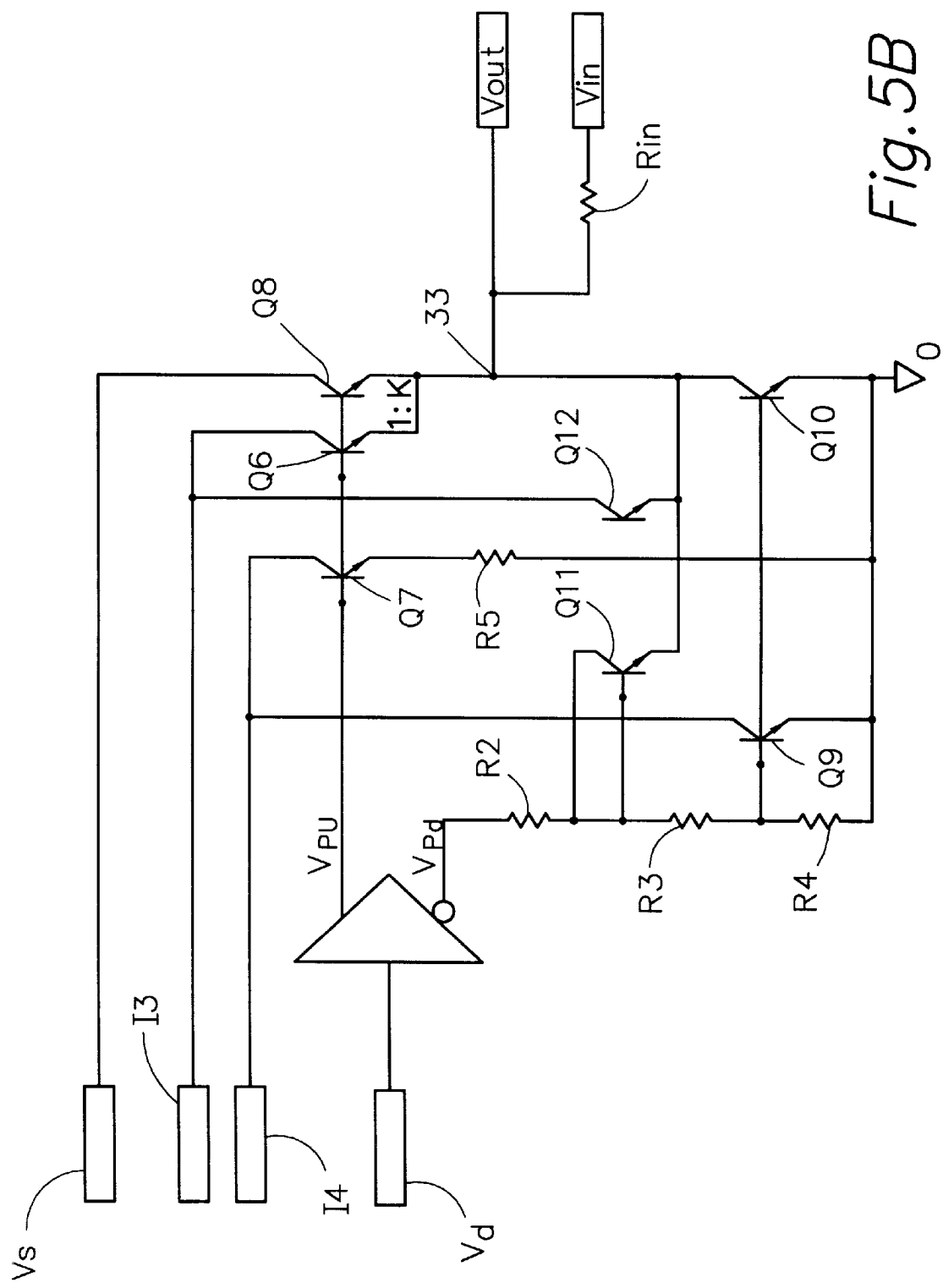

Table I shows one possible logic function of I1, I2 and $V_d$ in FIG. 5A that is representative of the input signal $V_{IN}$. With respect to FIG. 5B, transistors Q6 and Q12 and resistor R5 replace the logic function block. The emitter area ratio of transistor Q11 to transistor Q12 is M. When the output voltage $V_{OUT}$ at pin 32 is low, I3 is equal to the collector current of transistor Q12 and I4 is either low or high, depending on whether $V_{IN}$ is low or high. In other words, I4 and $V_{IN}$ change state in the same manner. If M is selected so that I3 is approximately midway between the low and high values of I4, the value of (I4-I3) will be low when $V_{IN}$ is low and it will be high when $V_{IN}$ is high. When $V_{OUT}$ is high, I4 is generally equal to the collector current of transistor Q6 and I3 is high when $V_{IN}$ is low. Conversely, under this circumstance I3 is low when $V_{IN}$ is high. If the magnitude of resistor R5 is selected so that I4 is approximately midway between the low and high values of I3, (I4-I3) will be low when $V_{IN}$ is low and it will be high when $V_{IN}$ is high. Therefore, the logic signal that is representative of the input signal $V_{IN}$ can be generated from I3 and I4. One possible way to represent the logic value of these two currents is by using two resistors for the purpose of converting the current differential (I4-I3) to a voltage differential.

In FIG. 5A, $V_{pu}$ is the pull-up voltage and $V_{pd}$ is the pull-down voltage. The level of the pull-up voltage varies directly with the output voltage $V_d$ and the pull-down voltage varies inversely with the output voltage $V_d$. In other words, the pull-up voltage and the pull-down voltage are out of phase because one is high when the other is low. When the output voltage $V_d$ is high, the pull-down voltage $V_{pd}$ is low and transistor Q10 is off. The pull-up voltage $V_{pu}$ is high and therefore $V_{OUT}$ is pulled up to a logic high level. If $V_d$ is low, the pull-up voltage $V_{pu}$ is low and transistor Q8 is off. The pull-down voltage is high and therefore transistor Q10 is on. This pulls $V_{OUT}$ to a logic low level. In other words, the logic level of $V_{OUT}$ varies directly with the logic level of $V_d$. The logic level at the first circuit point 32 is not affected by the receiving means or the voltage level of $V_{in}$. $V_{OUT}$ still varies directly with the logic level of $V_o$. The emitter area ratio of transistor Q8 to transistor Q7 is K and the emitter area ratio of transistor Q10 to transistor Q9 is L. The collector current ratios of two transistors which are active, but not in saturation, is approximately proportional to their emitter area ratio. Transistor Q10 is in saturation when $V_{OUT}$ is pulled to a low level. Transistor Q10 can be kept out of saturation by forming a pull-down feedback loop. This pull-down feedback loop comprises transistor Q11 and resistors R2, R3 and R4. The value of resistor R3 is approximately half of the value of resistor R4. If the output voltage is low, transistors Q8 and Q7 are off. Therefore, I1 is off. I2 is the collector current of transistor Q9 which is approximately 1/L times the first current. If $V_{in}$ is low, the first current is low and the second current is low. Conversely, if $V_{in}$ is high, the first and second currents are also high. When the output voltage, $V_d$ or $V_{OUT}$, is high, transistors Q10, Q9 and Q11 are off. Therefore, I2 is off. I1 is the collector current of transistor Q7 which is approximately 1/(1+K) times the first current. The first current and I1 vary inversely with $V_{in}$. The logic function of I1, I2 and $V_d$, or any combination of signals that is logically equivalent to $V_d$ can be used to generate a logic signal that is representative of the input signal $V_{in}$. One possible logic function is illustrated in Table I.

Figure 4:
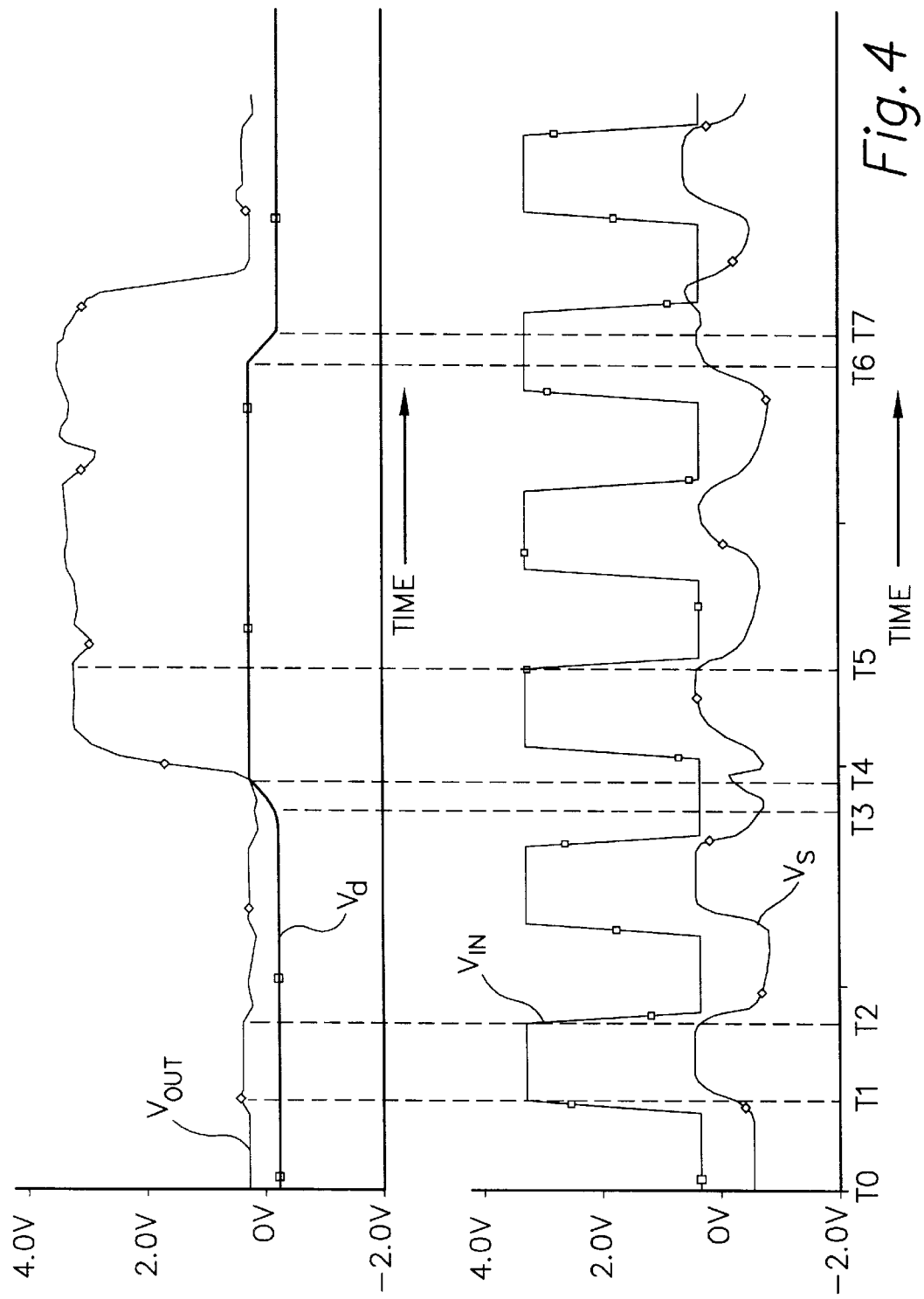
FIG. 4 illustrates two time-based curves of the input and output signals to show the lack of significant interference by the input signal on the output signal.

In order to function adequately as a means for simultaneously receiving input signals at a pin while also transmitting output signals to the same pin, the integrity of both the input and output signals must be maintained. In other words, the receipt of an input signal must not distort the output signal sufficiently to invalidate it. FIG. 4 illustrates the acceptability of the performance of the present invention as embodied in the circuit of FIG. 3. In the upper portion of FIG. 4, the voltage $V_{OUT}$ of the output at pin 32 is shown as the upper curve. The unbuffered output signal voltage $V_D$, which is the input to the output buffer section, is also illustrated in the upper portion of FIG. 4.

Between times T3 and T4, signal $V_D$ is raised. In response to that change, the output voltage $V_{OUT}$ at pin 32 is increased. This continues until the time period between time T6 and time T7, when signal $V_d$ is lowered.

The bottom portion of FIG. 4 represents a periodic input signal $V_{IN}$ provided by the second device 12. The lower curve in the bottom portion of FIG. 4 is the resulting voltage $V_S$ across circuit points B and A.

With continued reference to FIG. 4, it can be seen that the voltages $V_{OUT}$ and $V_{IN}$ at pin 32 interfere with each other to a very slight degree. In other words, it can be seen that a very small change occurs in signal $V_{OUT}$, between times T1 and T2, as a result of the imposition of signal $V_{IN}$ by the second device 12 shown in FIG. 3. The presence of signal $V_{IN}$ a high state creates a slight ripple in signal $V_{OUT}$, but this is not a sufficient change to deleteriously affect its validity as an output signal.

With respect to FIG. 3, Table II illustrates suggested values for selected components.

TABLE II

| REFERENCE | VALUE |
|---|---|
| RIN | 15 kΩ |
| R2 | 4 kΩ |
| R3 | 1 kΩ |
| R4 | 3 kΩ |
| R5 | 25 kΩ |
| R6 | 5 kΩ |
| R7 | 5 kΩ |
| RI(of second device 12) | 1 kΩ |
| CI(of second device 12) | 5 picofarads |

The present invention has been described in particular detail and illustrated with specific components related to a preferred embodiment. However, it should be understood that alternative embodiments of the present invention are within its scope.

The embodiments of the invention in which an exclusive property or right is claimed are defined as follows:

1. A circuit, comprising:
    a first circuit point;
    means for transmitting an output signal to said first circuit point; and
    means for receiving an input signal at said first circuit point simultaneously with said transmitting means transmitting said output signal to said first circuit point.
2. The circuit of claim 1, wherein:
    said receiving means comprises a means for determining a voltage magnitude of said output signal.
3. The circuit of claim 2, wherein:
    said receiving means comprises a means for determining a magnitude of a first current flowing through said first circuit point.
4. The circuit of claim 3, wherein:
    said receiving means comprises a means for converting said first current to a voltage differential between second and third circuit points.
5. The circuit of claim 4, wherein:
    said voltage differential is representative of said input signal to said first circuit point.
6. The circuit of claim 5, wherein:
    said receiving means comprises a first transistor and a second transistor, each of said first and second transistors having a base, an emitter and a collector, the bases of said first and second transistors being connected together, the emitters of said first and second transistors being connected to said first circuit point.
7. The circuit of claim 6, wherein:
    said receiving means comprises a third transistor and a fourth transistor, each of said third and fourth transistors having a base, an emitter and a collector, the bases of said third and fourth transistors being connected together, the emitters of said third and fourth transistors being connected to said first circuit point.
8. The circuit of claim 7, wherein:
    said receiving means comprises a fifth transistor having a base, an emitter and a collector, the base of said fifth transistor being connected to said base of said first transistor, the collector of said fifth transistor being connected to said second circuit point, and the emitter of said fifth transistor being connected to a ground potential.
9. The circuit of claim 8, wherein:
    said receiving means comprises a sixth transistor and a seventh transistor, each of said sixth and seventh transistors each having a base, an emitter and a collector, the collector of said sixth transistor being connected to said second circuit point, the collector of said seventh transistor being connected to said first circuit point, and the emitters of said sixth and seventh transistors being connected to the ground potential.
10. The circuit of claim 9, wherein:
    the collector of said first transistor is connected to said third circuit point.
11. The circuit of claim 10, wherein:
    the collector of said fourth transistor is connected to said third circuit point.
12. A circuit, comprising:
    a first circuit point;
    means for transmitting an output signal to said first circuit point; and
    means for receiving an input signal at said first circuit point simultaneously with said transmitting means transmitting said output signal to said first circuit point, said receiving means comprising a means for determining logic level of said output signal, said receiving means comprising a means for sensing a first current flowing through said first circuit point.

13. The circuit of claim 12, wherein:

said receiving means comprises a means for converting said first current to a voltage differential between second and third circuit points.

14. The circuit of claim 13, wherein:

said voltage differential is representative of said input signal to said first circuit point.

15. The circuit of claim 14, wherein:

said receiving means comprises a first transistor and a second transistor, each of said first and second transistors having a base, an emitter and a collector, the base of said first and second transistors being connected to said first circuit point.

16. The circuit of claim 15, wherein:

said receiving means comprises a third transistor and a fourth transistor, each of said third and fourth transistors having a base, an emitter and a collector, the bases of said third and fourth transistors being connected together, and the emitters of said third and fourth transistors being connected to said first circuit point.

17. The circuit of claim 16, wherein:

said receiving means comprises a fifth transistor having a base, an emitter and a collector, the base of said fifth transistor being connected to said base of said first transistor, the collector of said fifth transistor being connected to said second circuit point, and the emitter of said fifth transistor being connected to a ground potential.

18. The circuit of claim 17, wherein:

said receiving means comprises a sixth transistor and a seventh transistor, each of said sixth and seventh transistors having a base, an emitter and a collector, the collector of said sixth transistor being connected to said second circuit point, the collector of said seventh transistor being connected to said first circuit point, and the emitters of said sixth and seventh transistors being connected to the ground potential.

19. The circuit of claim 18, wherein:

the collector of said first transistor is connected to said third circuit point; and the collector of said fourth transistor is connected to said third circuit point.

20. A circuit, comprising:

a first circuit point;

means for transmitting an output signal to said first circuit point; and means for receiving an input signal at said first circuit point simultaneously with said transmitting means transmitting said output signal to said first circuit point, said receiving means comprising a means for determining if said output signal is being transmitted, said receiving means comprising a means for sensing a first current flowing through said first circuit point, said receiving means comprising a means for converting said first current to a voltage differential between second and third circuit points, said voltage differential being representative of said input signal at said first circuit point, said receiving means comprising a first transistor and a second transistor, each of said first and second transistors having a base, an emitter and a collector, the bases of said first and second transistors being connected to said first circuit point, the emitters of said first and second transistors being connected together, said receiving means comprising a third and fourth transistor, each of said third and fourth transistors having a base, an emitter and a collector, the bases of said third and fourth transistors being connected to said first circuit point, the emitters of said third and fourth transistors being connected together, said receiving means comprising a fifth transistor having a base, an emitter and a collector, the base of said fifth transistor being connected to said base of said first transistor, the collector of said fifth transistor being connected to said second circuit point, the emitter of said fifth transistor being connected to a ground potential, said receiving means comprising a sixth transistor and a seventh transistor, each of said sixth and seventh transistors having a base, an emitter and a collector, the collector of said sixth transistor being connected to said second circuit point, the collector of said seventh transistor being connected to said first circuit point, the emitter of said sixth and seventh transistor being connected to the ground potential, the collector of said first transistor being connected to said third circuit point, the collector of said fourth transistor being connected to said third circuit point.

* * * * *